Patented Apr. 20, 1926.

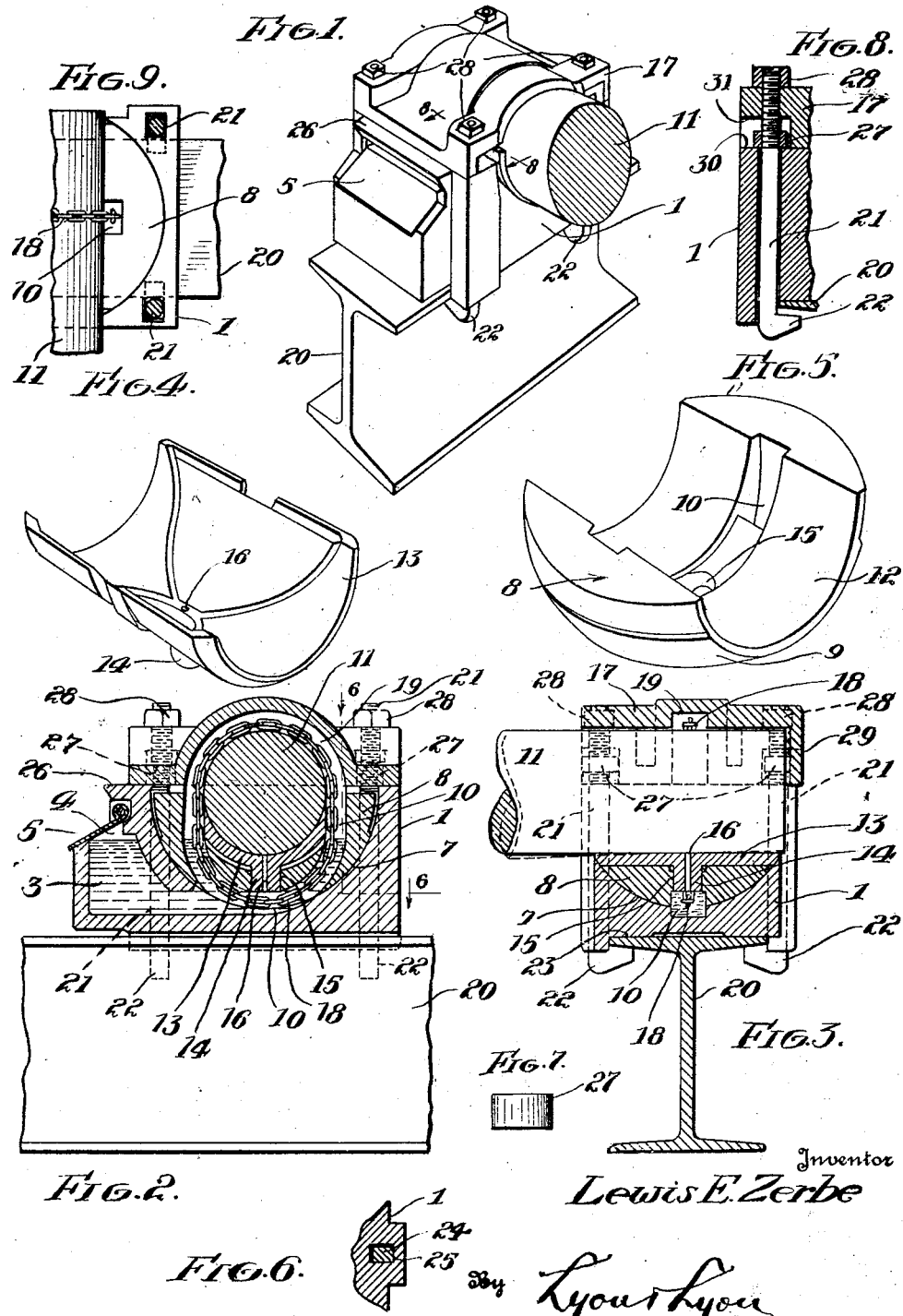

1,581,376

UNITED STATES PATENT OFFICE.

LEWIS E. ZERBE, OF MONETA, CALIFORNIA, ASSIGNOR TO UNION TOOL COMPANY, OF TORRANCE, CALIFORNIA, A CORPORATION OF CALIFORNIA.

SELF-ALIGNING CROWN-SHAFT BEARING.

Original application filed March 22, 1923, Serial No. 626,791. Patent No. 1,506,105. Divided and this application filed May 28, 1924. Serial No. 716,365.

*To all whom it may concern:*

Be it known that I, LEWIS E. ZERBE, a citizen of the United States, residing at Moneta, in the county of Los Angeles and State of California, have invented a new and useful Self-Aligning Crown-Shaft Bearing, of which the following is a specification.

This invention relates to crown-block bearings such as used at the crown-block of derricks for supporting the shafts of the crown sheaves or casing line sheaves. These crown-blocks are subjected to enormous strains, and as the derricks are not perfectly rigid there is a tendency for the sheaves to get out of alignment with the well hole. Furthermore, these bearings are exposed to sand that is brought up on the sand line, and in addition to this, sand from the desert is often blown against the bearings during wind storms. By reason of the height of the derricks, it is not feasible to give the crown bearings constant attention and therefore they should be constructed so that they are capable of operating continuously without attention. The general object of this invention is to provide a bearing which is constructed so that it can be readily adjusted along its supporting beam and which is also constructed so that the boxes of the bearings will automatically maintain themselves in alignment so as to properly support the shaft of the sheaves regardless of faulty alignment of the boxes in a vertical or horizontal plane; also to provide a bearing of this type with improved means for insuring the lubrication of the bearing.

This application contains subject matter divided from my former application on shaft bearing, Serial No. 626,791, filed March 22, 1923, now issued as Patent No. 1,506,105.

Further objects of the invention will appear hereinafter.

The invention consists in the novel parts and combinations of parts to be described hereinafter, all of which contribute to produce an efficient crown-block bearing.

A preferred embodiment of the invention is described in the following specification while the broad scope of the invention is pointed out in the appended claims.

In the drawings:

Fig. 1 is a perspective illustrating a bearing embodying the invention.

Fig. 2 is a cross-section through the bearing and showing a portion of the supporting beam in side elevation.

Fig. 3 is a longitudinal section through the bearing, showing a portion of the shaft and illustrating the supporting beam in cross-section.

Fig. 4 is a perspective illustrating details of the construction of a bushing which constitutes a feature of the invention.

Fig. 5 is a perspective of a ball-seat or cradle which supports the bushing.

Fig. 6 is a horizontal section taken about on the line 6—6 of Fig 2, passing through the corner of the housing of the bearing and further illustrating details of the arrangement of the holding-down bolts.

Fig. 7 is a side elevation of a spanner nut used as a retainer for the bearing bolts.

Fig. 8 is a vertical section taken through the box at one of the holding-down bolts, that is, about in the plane of line 8—8 on Fig. 1, certain parts being broken away; this view illustrates details of the construction that facilitates adjusting the box along the beam.

Fig. 9 is a plan of the box and shaft, with the cap of the bearing removed, certain parts being shown in section and broken away.

In the preferred embodiment, the bearing comprises a box 1 (see Figs. 1 and 2) which is provided with a reservoir 3 adapted to be filled with a lubricant or oil, and this reservoir is provided with a filling opening 4 disposed at one side and covered by a rainproof lid 5. This box is provided with swivel means for freely supporting the shaft. For this purpose, on its upper side the box is provided with a socket 7 having a substantially spherical face which receives a cradle or ball-seat 8, (see Fig. 5). This seat is formed with a substantially spherical rubbing face 9 which engages and fits to the face of the socket 7.

The bearing is constructed with means for constantly supplying lubricant to the journal of the shaft. For this purpose, between the box 1 and the ball-seat I provide a duct 10 which passes transversely under the position of the shaft 11, and this duct communicates with the reservoir 3, and operates to admit the lubricant to the rubbing faces of the ball-seat and the socket. I prefer to form this duct partly in the ball-seat and partly in the box at its lower portion, but above it is formed entirely in the ball-seat, that is to say, below it is formed in the meeting faces of the ball-seat and the box.

The upper side of the ball-seat 8 is provided with a semi-cylindrical bore 12 upon which is fitted a bushing 13 of bronze or other suitable bearing metal. This bushing extends continuously throughout the length of the bearing. In order to secure this bushing in place I prefer to provide it near its underside with an integral pintle 14 which fits into an opening 15 formed through the underside of the ball-seat.

Means are provided for returning the lubricant from the journal to the reservoir. This tends to keep the oil from going out at the ends of the bearing. For this purpose I prefer to provide a port or duct 16 which passes down through the pintle 14 and communicates with the duct 10 (see Fig. 3). The shaft and ball-seat are covered by a cap 17 which extends over the box and seats upon the box.

A bearing having the construction described above may be supported in any suitable manner, and will afford a self-aligning support for a shaft. I prefer, however, to provide means for supplying the lubricant to the upper side of the shaft. For this purpose, in this instance, I extend the duct 10 sufficiently at each side of the shaft 11 to enable it to carry this oil-elevating means. In the type of bearing described above, this means is in the form of an endless chain 18 the loop of which hangs in the duct 10 so that as the shaft rotates it will carry oil to its upper face. The cap 17 may be provided with a chain groove 19 to accommodate this chain (see Fig. 3).

I construct the bearing so as to facilitate its attachment and adjustment on a beam, such as an I-beam 20; I provide means for securing the box to the beam, and this means may also operate to secure the cap on the box. For this purpose I provide a plurality of bolts 21, the lower ends of which are provided with hooks 22 which engage the beam. Where the beam is of the I-form these hooks engage under the edges of the upper flange.

I also provide the box with means for engaging the beam so as to fix it to the beam, that is to say, I provide means to prevent the box from shifting laterally on the beam. For this purpose I provide the underside of the box with a recess 23, the side faces of which fit to and engage snugly the side edges of the upper flange of the beam.

The box 1 may be provided with means for guiding the bolts when they are shoved up into position and this means is preferably constructed so as to prevent rotation of the bolts when their nuts are being applied to them. For this purpose the lower portions of the bolts are formed with angular or square shanks 24, (see Fig. 6) which are received in square guideways 25 in the box.

The bolts are provided with bolt-retainers which are attached to the bolts so as to permit the hooks 22 to hang clear of the beam when the cap nuts 28 on the upper ends of the bolts are loosened; in the present instance the bolt-retainers 27 are in the form of round nuts that are screwed down to the end of the thread on each bolt and left there. The end of the thread is so located that when the retainer is in place it will be held down above its seat 30 on the upper face of the box 1 (see Fig. 8). Adjacent each retainer the cap is provided with a recess 31 to permit a limited up and down movement of the retainer; the clearance in this recess of course should be sufficient to enable the nuts 28 to be tightened to clamp the hooks 22 against the beam, without having the retainer strike the upper wall of its recess.

If desired the cap 17 may have an end wall 29 which projects down beyond the end face of the shaft 11 so as to enable the bearing to take end thrust.

When two bearings having the features of construction illustrated in Fig. 1 are supporting a shaft with sheaves between the bearings, the swivel feature of the bearing, together with the feature of construction which enables the bearings to be shifted on their beams, enables the bushings of the bearings to maintain a proper working alignment under the severest working conditions. The swivelling of the ball-seat 8 in a horizontal plane enables it to adapt the bearing to faulty alignment in a horizontal plane; furthermore, it will be evident that this ball-seat can tilt in a vertical plane and hence one of the bearings can be considerably out of vertical alignment with the opposite bearing, and the bushings will still maintain a proper working alignment. This latter feature is very advantageous because in some cases the beams supporting one bearing may be considerably below or above the opposite beam carrying the other bearing for the shaft.

By reason of the spherical form of the cradle 8, I am enabled to locate the bolts 21 quite close to the shaft (see Fig. 9). This, of course, results by reason of the fact that at the ends of the journal the face of the spherical cradle extends toward the shaft in an inclined direction so as to leave a corner of the "rectangle" of the box beyond the cradle, and well within the space lying between the plane of the side wall and the shaft.

It is understood that the embodiment of the invention described herein is only one of the many embodiments this invention may take, and I do not wish to be limited in the practice of the invention, nor in the claims, to the particular embodiment set forth.

I claim:

1. In a shaft bearing of the kind described, the combination of a beam, a box supported by the beam with bolts for securing the same to the beam, and having a substantially spherical socket between the bolts, a ball-seat freely movable in the socket for supporting the shaft, and a cap separate from the box, seating on the box and held in place by the bolts.

2. In a shaft bearing of the kind described, the combination of a beam, a box supported by the beam with bolts for securing the same to the beam, and having a substantially spherical socket between the bolts, a ball-seat freely movable in the socket for supporting the shaft, a cap separate from the box, seating on the box, and held in place by the bolts, said box having an oil reservoir admitting oil to the rubbing faces of the socket and seat.

3. In a shaft bearing of the kind described, the combination of a beam, a box supported by the beam with bolts for securing the same to the beam, and having a substantially spherical socket between the bolts, a ball-seat freely movable in the socket for supporting the shaft, and a cap separate from the box, seating on the box to hold the shaft on the ball-seat, held in place by the bolts, said box having an oil reservoir with a communicating duct passing under the shaft position and an endless lubricating chain passing through the duct and extending up over the shaft position.

4. In a bearing, the combination of a box having a spherical socket on its upper side, a ball-seat in the socket with a spherical face lying against the spherical face of the socket, a bushing to support the shaft received in the socket and having a pintle on its under side engaging the ball-seat, said box having a reservoir for lubricant extending under the pintle, said pintle having a duct extending through it and through the bushing and communicating at its lower end with the reservoir, said pintle operating to center the bushing and prevent its shifting longitudinally.

5. In a shaft bearing of the kind described, the combination of a box having a socket on its upper side, a ball-seat freely movable in the socket, a bushing carried on the ball-seat and extending continuously throughout the length of the bearing, said box having a reservoir for a lubricant, said box and said ball-seat having a duct formed therebetween extending up the sides of the bearing, communicating with the reservoir and admitting the lubricant to the rubbing faces of the socket and the ball-seat, and means in the duct for conducting the lubricant upwardly and over the shaft position.

6. In a shaft bearing of the kind described, the combination of a box having a socket on its upper side, a ball-seat freely movable in the socket, a bushing carried on the ball-seat, said box having a reservoir for a lubricant, said box and said ball-seat having a duct formed in the meeting faces thereof extending up the sides of the bearing, communicating with the reservoir and admitting the lubricant to the rubbing faces of the socket and the ball-seat, and an endless chain extending through the duct and up over the shaft position operating to carry the lubricant over the shaft.

7. In a shaft bearing of the kind described, the combination of a box having a socket on its upper side, a ball-seat freely movable in the socket, a bushing carried on the ball-seat, said box having a reservoir for a lubricant, said box and said ball-seat having a duct extending up the sides of the bearing, formed partly in the box and partly in the ball-seat, communicating with the reservoir and admitting the lubricant to the rubbing faces of the socket and the ball-seat, and means in the duct for conducting the lubricant upwardly and over the shaft position, said bushing having a lubricant duct communicating with the first named duct for returning the lubricant to the reservoir from the rubbing faces of the bushing.

8. In a shaft bearing of the kind described, the combination of a box having a socket on its upper side, a ball-seat freely movable in the socket, a bushing carried on the ball-seat, said box having a reservoir for a lubricant, said box and said ball-seat having a duct at the middle point of the bearing, extending up the sides, formed partly in the ball-seat and partly in the box, communicating with the reservoir and admitting the lubricant to the rubbing faces of the socket and the ball-seat, means in the duct for conducting the lubricant upwardly and over the shaft position, a cap seating on the box, a beam supporting the box, and bolts securing the box on the beam and securing the cap on the box.

9. In a shaft bearing, the combination of a box having a reservoir for a lubricant and having a socket on its upper side, a ball-seat mounted in the socket and freely movable therein, a bushing received on the ball-seat and having a pintle passing downwardly into the ball-seat operating to prevent longitudinal shifting of the bushing, said pintle having a duct therethrough communicating with the reservoir and operating to return the lubricant from the rubbing faces of the bushing to the reservoir.

10. In a shaft bearing, the combination of a box having a reservoir for a lubricant and having a socket on its upper side, a ball-seat mounted in the socket and freely movable therein, a bushing received on the ball seat and having a pintle passing downwardly into the ball-seat operating to prevent longitudinal shifting of the bushing, and having a duct therethrough communicating with the reservoir and operating to return the lubricant from the rubbing face of the bushing to the reservoir, a cap seating on the box, a beam supporting the box, and bolts securing the cap to the box.

11. In combination in an adjustable crown-block, a slidable base forming the receptacle for a lower bearing and having a reservoir for containing lubricant, conveying means for transferring the lubricant from the reservoir to the wearing surfaces of the bearing, said base having a beam engaging recess preventing displacement from the beam and having beam engaging hook bolts extending therethrough for locking the base in any adjusted position on the beam.

12. In a shaft bearing of the kind described, the combination of a box having a spherical socket on its upper side, a ball-seat having a spherical face freely movable in the socket, a bushing carried on the ball-seat, said box having a reservoir for a lubricant, said box and said ball-seat having a duct formed therebetween communicating with the reservoir and admitting the lubricant to the rubbing faces of the socket and the ball-seat, and an endless chain extending through the duct and up over the shaft position operating to carry the lubricant over the shaft.

13. In a shaft bearing of the kind described, the combination of a box having a spherical socket on its upper side, a ball-seat having a spherical face freely movable in the socket, a bushing carried on the ball-seat, said box having a reservoir for a lubricant, said box and said ball-seat having a duct formed therebetween communicating with the reservoir and admitting the lubricant to the rubbing faces of the socket and the ball-seat, and means in the duct for conducting the lubricant upwardly and over the shaft position, said bushing having a lubricant duct communicating with the first named duct for returning the lubricant to the reservoir from the rubbing faces of the bushing.

Signed at Torrance, Calif., this 19th day of May 1924.

LEWIS E. ZERBE.